Figures 1, 2:
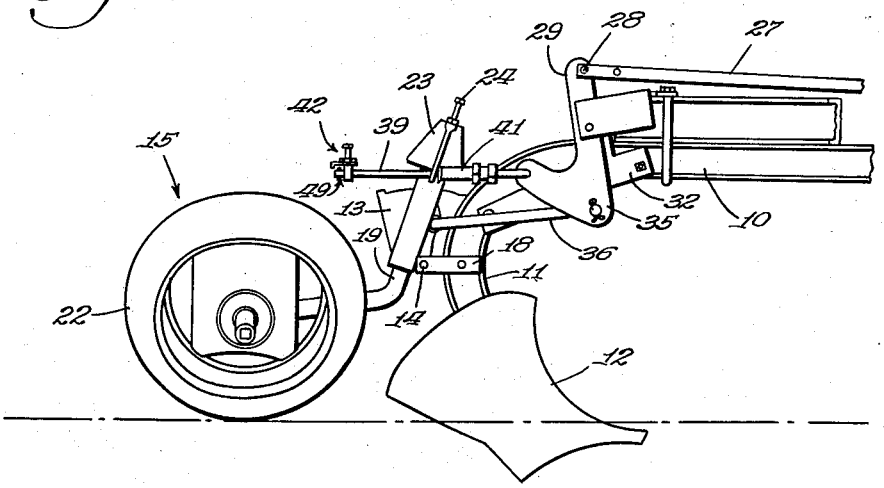

Inventor:
C. R. Baughman

Patented Dec. 1, 1953

2,660,940

UNITED STATES PATENT OFFICE 2,660,940

CASTER WHEEL LOCK

Charles R. Baughman, Fiatt, Ill., assignor to International Harvester Company, a corporation of New Jersey Application December 6, 1949, Serial No. 131,420

2 Claims. (Cl. 97—127)

This invention relates to agricultural implements and particularly to plows. More specifically the invention concerns a rear furrow wheel mounting for a plow.

An object of the invention is to provide improved means optionally operable to permit castering of the plow rear furrow wheel or to hold it rigid. Where a pneumatic tire is mounted upon a rear furrow wheel, as has become general practice in recent years in farm operations, it is desirable when the plow is being transported to avoid scuffing of the rubber tire. In earlier days when metal wheels were used, it was customary to permit the furrow wheel to caster in operating position as the plow was being transported by a tractor or other source of power. However, with the advent of higher tractor speeds, particularly on highways, it is desirable that the plow furrow wheel remain rigid and not be allowed to caster so that the plow will not wobble from one side of the road to the other.

Another object of the invention is to provide in a plow having a furrow wheel which is capable of castering in its operating position, means for quickly locking the furrow wheel against castering when the plow is raised to its transport position.

Other objects and advantages of the invention will become clear from the following detailed description when read in conjunction with the accompanying drawings wherein:

Fig. 1 is a view in side elevation of the rear end of a plow having a rear furrow wheel mounted thereon embodying the features of the present invention and showing the plow in operating position; and Fig. 2 is an enlarged view in perspective showing the position of the parts when the plow is raised to its transport position.

In the drawings, it will be noted that the plow with which the present invention is concerned is provided with a supporting frame of generally conventional construction comprising a longitudinally extending tool beam 10 provided at its rear end with a downwardly curved portion 11 having mounted at its lower end a plow bottom 12.

Affixed to the rear end of the beam 10 and extending rearwardly therefrom is a bracket 13 having an aperture therein in which is mounted a transversely extending pivot pin 14 upon which is supported a rear furrow wheel assembly indicated at 15 which includes a generally vertically extending bearing member 16 having a boss 17 thereon journaled on the pin 14 for rocking movement in a fore and aft direction of the bearing member 16. Pin 14 is connected to the curved portion 11 of the plow beam 10 by a bracing strap 18.

Rotatably received in the bearing member 16 is the vertically extending spindle portion 19 of an axle 20 having a rearwardly extending portion 21 upon which is journaled a pneumatic tired rear furrow wheel 22. The upper end of spindle 19 projects through the upper end of the bearing member 16 and has secured thereto a cap 23. Cap 23 is removably secured to the upper end of the spindle by any suitable means such as screws 24 and 25 and is provided with a radially extending arm 26. Thus it will be observed that the spindle portion 19 of the axle 20 is capable of axial rotation in the sleeve or bearing member 16 and that the cap member 23 rotates therewith to permit castering of the furrow wheel 22. It will likewise be observed that in Figure 1 the plow bottom 12 is in its operating position, while in Figure 2 the wheel axle 20 has been swung about its pivot upon the pin 14 to move the furrow wheel vertically downwardly and thus elevate into a transport position the plow bottom or bottoms 12.

Movement of the furrow wheel to raise and lower the plow elements is accomplished by mechanism of a conventional nature deriving power from one of the plow wheels or from the tractor by which the implement is propelled, acting through a push rod 27 which extends longitudinally and the rear end of which is pivotally connected at 28 to one arm 29 of a bell crank 30, which is pivotally mounted at 31 upon a bracket 32 secured by bolts 33 and 34 to the rear end of the beam 10. Another arm 35 of the bell crank is pivotally connected by a link 36 to the bearing member 16, the rear end of the link 36 being bent laterally for pivotal reception in a boss 37 secured to or forming a part of the sleeve or bearing 16. At this point it should be clear that upon operation of the power lift means, not shown, operating through the push rod 27, the motion will be transmitted through the bell crank 30 and link 36 to rock the wheel axle 20 about the pivot pin 14 to elevate or depress the wheel and to rock the spindle portion 19 in a fore and aft direction.

Arm 35 of bell crank 30 is provided with an extension 38 to which is pivotally connected one end of a link 39. The rear portion of link 39 is arcuately bent as will be clear from a study of Figure 2 and is slidably received in an aperture 40 in the end of the arm 26 at the upper end of spindle 19. In the operating position of the plow as shown in Figure 1, therefore, the arm 26 rests against an abutment member 41 on the link 39 and the wheel is capable of castering in its position against the furrow wall formed by the plow bottoms in order to permit the wheel to follow the changes in direction of the plow. As pointed out before, however, it is very desirable under high speed transport conditions that the wheel 22 be held against castering.

When the plow is raised to transport position as shown in Figure 2, the push rod 27 has moved forwardly and link 36 has urged the spindle portion of axle 20 rearwardly about the pivot 14. The arm 26 is then positioned about midway of the arcuate portion of the guide rod 39. In order to secure the arm 26 to the guide rod 39 and still readily permit quick release of the arm to accommodate rotation of the spindle portion 19, locking means 42 is provided. This locking means comprises a collar 43 having a set screw 44 seated therein for securing the collar to the rod 39. There is likewise provided a clip in the form of an angle member 45 having a main body portion 46 apertured for loose reception upon the set screw 44. Clip 45 is provided with a bent portion 47 bent at right angles to the body portion 46. With the collar 43 abutting one side of the arm 26, the clip 45 may be swung into position with its right angled bent portion 47 engaging the opposite side of the arm, thus confining the arm 26 between the bent portion 47 and the collar 43. Set screw 44 secures collar 43 to the rod 39, and a nut 48 on the threaded portion of the set screw 44 confines the clip between the nut and the collar so that it may be tightened in position. The clip 45 may be readily withdrawn from operative position for locking the arm 26 with respect to the rod 39 by simply loosening the nut 48 and set screw 44. The clip 45 may be swung away from its position against the arm 26 and collar 43 may be slipped off the rod 39 by removing cotter key 49 or it may be adjusted to the position shown in Figure 1 with the locking assembly 42 at the end of the guide rod adjacent the cotter key 49. The edge of the bent portion 47 is preferably grooved as indicated at 50 for engagement with rod 39.

The operation of the locking mechanism of the present invention should be clear from the foregoing description. It should be understood, of course, that modifications may be made therein without departing from the spirit of the invention or the scope of the appended claims.

What is claimed is:

1. In a plow or the like having earth working tools and including a support, a castering furrow wheel connected to the support and movable relative thereto to raise and lower the tools, and an axle supporting the wheel, said axle having a rotatable spindle portion movable with the wheel relative to the support, in combination, a radially projecting arm on the spindle having an aperture therein, a guide rod connected to the support having an arcuately bent portion slidably receivable in said aperture to accommodate rotation of the spindle and castering of the wheel, a collar on the rod on one side of said arm, a set screw for securing the collar to the rod, a releasable clip member carried by the collar, said clip member having an angled portion arranged to engage said arm on the side opposite the collar to hold the arm against movement and prevent castering of the wheel, and a nut on the set screw for releasably securing the clip member to the collar.

2. The combination with a rear furrow wheel for a plow or the like including a wheel-carrying axle mounted on the plow frame on a transverse axis for swinging movement relative to the plow frame and having a generally vertically extending spindle portion rotatable to permit castering of the wheel, of a connection between the plow frame and the axle for swinging the wheel in a generally vertical longitudinal plane to raise and lower the plow, and means optionally operable to accommodate rotation of the spindle portion and castering of the furrow wheel comprising a radially extending arm on the spindle portion of the axle having an aperture therein, a guide rod slidably receivable in said aperture and having one end pivotally connected to the plow frame, said rod being bent to accommodate movement of the arm in both directions during castering of the wheel, a collar adjustable to selected positions on the rod, an angled member carried by the collar having a bent portion engageable with said arm opposite the collar, means for securing the collar to the rod, and independently operable means for securing the angled member to the collar.

CHARLES R. BAUGHMAN.

References Cited in the file of this patent

UNITED STATES PATENTS

| Number | Name | Date |
|---|---|---|
| 971,157 | Smith | Sept. 27, 1910 |
| 1,023,492 | Anderson | Apr. 16, 1912 |
| 1,435,291 | Graham | Nov. 14, 1922 |
| 2,518,972 | Allen | Aug. 15, 1950 |